United States Patent

McGuinness

[19]

[11] Patent Number: 6,006,354
[45] Date of Patent: Dec. 21, 1999

[54] SECURITY DEVICE FOR A VIDEO DIGITAL TO ANALOG CONVERTER

[75] Inventor: Peter John McGuinness, San Jose, Calif.

[73] Assignee: STMicroelectronics, Inc., Carrollton, Tex.

[21] Appl. No.: 08/797,966

[22] Filed: Feb. 12, 1997

[51] Int. Cl.[6] .................................................. H03M 13/00
[52] U.S. Cl. .............................. 714/758; 714/757; 463/1
[58] Field of Search ............................. 371/37.01–37.07, 371/40.13; 714/752, 776, 781, 757, 758; 463/1

[56] References Cited

U.S. PATENT DOCUMENTS

| | | | |
|---|---|---|---|
| 4,176,780 | 12/1979 | Sacher et al. | 371/25.1 |
| 4,672,365 | 6/1987 | Gehman et al. | 340/539 |
| 4,894,718 | 1/1990 | Hung | 358/139 |
| 5,130,991 | 7/1992 | Takano | 371/37.6 |
| 5,282,214 | 1/1994 | Dravida | 371/37.6 |
| 5,361,266 | 11/1994 | Kodama et al. | 371/37.7 |
| 5,465,260 | 11/1995 | Zook | 371/37.7 |
| 5,479,654 | 12/1995 | Squibb | 395/600 |
| 5,517,512 | 5/1996 | Saegusa | 371/37.8 |
| 5,564,030 | 10/1996 | Whitted, III et al. | 711/201 |

*Primary Examiner*—Emmanuel L. Moise
*Attorney, Agent, or Firm*—David V. Carlson; Theodore E. Galanthay; Lisa K. Jorgenson

[57] ABSTRACT

A method and circuits for checking for a pattern on a display is provided where the CRC of the pattern is calculated and compared to a CRC reference. A blanking signal is produced when the two patterns do not match. Video pixel data and a first seed value are processed in a CRC circuit generating a first CRC value. The first CRC reference is stored in a first memory that can be one 24 bit register, much smaller than the 2048 bit pattern storage memory conventionally required for the 32×16×2 pattern. The comparison circuit compares the first CRC value and the first CRC reference, producing an unequal signal at the input of a control circuit if they do not match. The control circuit also receives a D/A blanking signal. Responsive to an unequal signal, the control circuit produces and latches the blanking signal at its output and the input of the D/A converter coupled to it. The D/A converter stops producing analog video output, and the screen goes blank. For interlaced images the CRC circuit generates a first even and odd CRC values. The CRC references also need to be based on even or odd interlaced frames of the protected pattern. The even and/or odd CRC value is compared to its respective CRC reference in the comparison circuit and the result passed to the control circuit. For additional security the CRC circuit can generate a second CRC value based on a second seed value and the video pixel data. The comparison circuit compares the second CRC value to a second CRC reference stored in a second memory. When the two do not match the unequal signal is produced at the output of the comparison circuit and is latched by the control circuit at the input of a D/A converter. Having two CRC values increases the security, because to keep the D/A converter from shutting down either the protected pattern or a different pattern that produces two identical CRC values has to be generated.

30 Claims, 3 Drawing Sheets

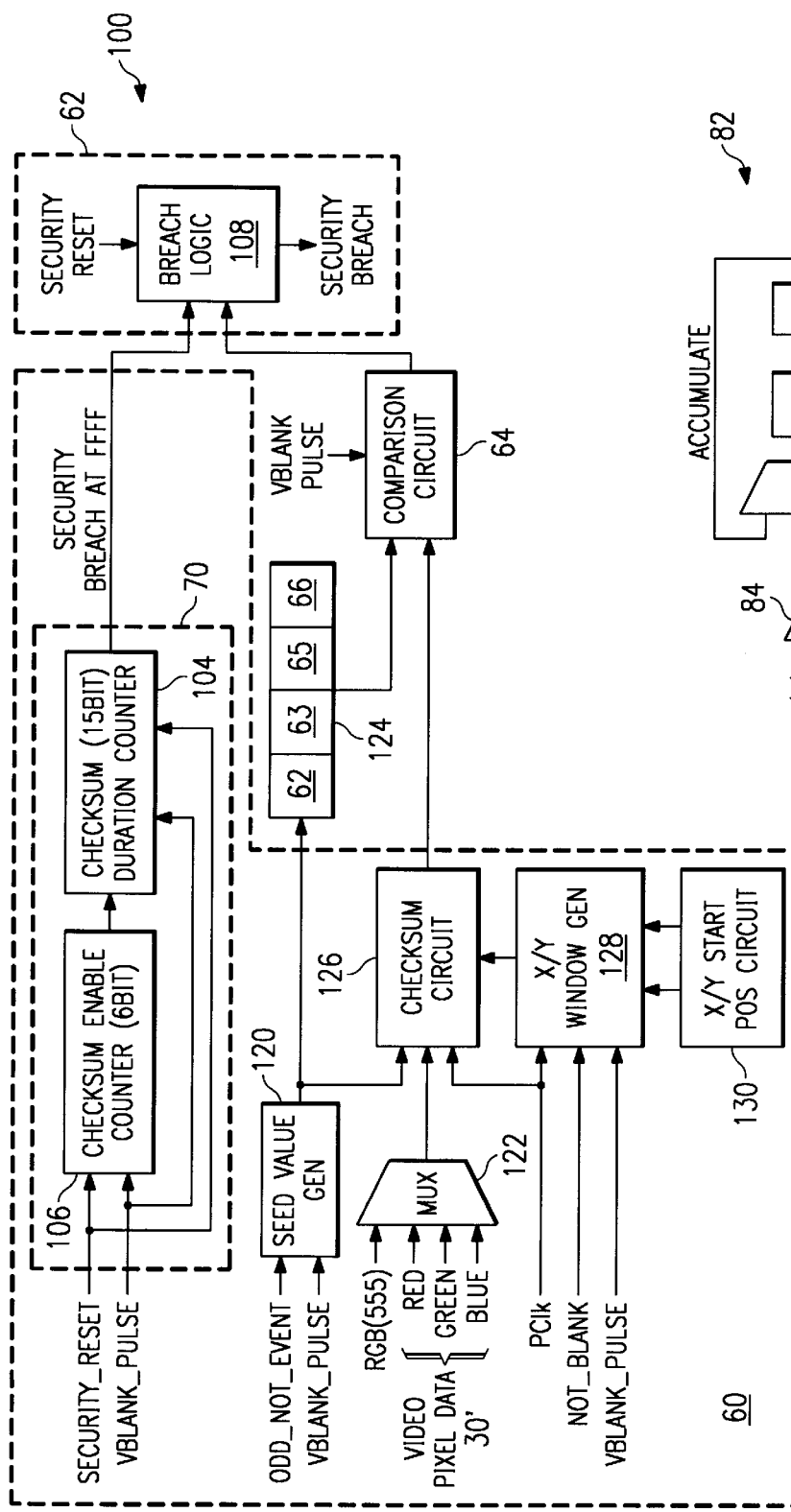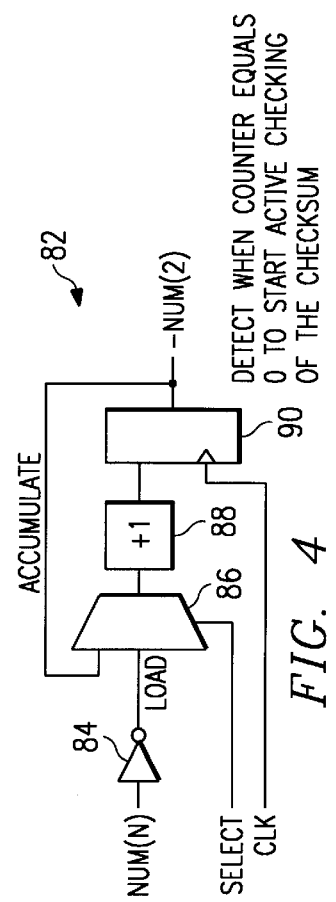

SECURITY DEVICE FOR A VIDEO DIGITAL TO ANALOG CONVERTER

BACKGROUND AND SUMMARY OF THE INVENTION

The present invention relates generally to the field of electronic devices, and is more specifically directed to a method and circuitry for comparing data.

The manufacture of software to comply to proprietary hardware standards without a license from the owner of the hardware standards, hereinafter unlicensed software, is a significant problem for the owner of the hardware standards and for software producers who have obtained a license, hereinafter licensed software producers. This problem can lead to low quality software because the owner of the proprietary standard is not given a chance to review the unlicensed software before it is released to the market. This is particularly of concern to game console manufacturers, who have proprietary standards for the manufacture of the console and either manufacture or license others to manufacture games, i.e. the software to operate on their hardware.

Many game console manufacturers have installed security devices to prevent unlicensed software from being able to play on their consoles. These security devices try to prevent games which are not manufactured by the console manufacturers or their licensees, but are manufactured by parties who are not licensed to manufacture games for the console, hereinafter unlicensed software producers.

If the security device determines that the game is not manufactured by a licensed software producer the console shuts down. Typically, from a technical viewpoint, most security devices can be designed around by the unlicensed software producers.

To avoid the problem of unlicensed games, some owners of the proprietary hardware standards for game consoles implement a security scheme that involves sending a pattern, hereinafter overlay pattern, to the display device and comparing this pattern with a reference pattern that is legally protected, such as a copyrighted pattern or is a pattern of a trademark. If the overlay pattern is different from the reference pattern the security device shuts down the console. If the overlay pattern corresponds to the reference pattern and the unlicensed software producer displays such a protected pattern he is violating the owner's copyright or trademark and the owner can typically stop the sale of products that violates his copyright or trademark.

FIG. 1 illustrates one such security device 10. The security device 10 is connected to a host interface 12 through a data bus 13 and an address bus 15. The security device 10 contains a pattern storage memory 14 for storing the overlay and reference patterns. When the overlay pattern is written to the pattern storage memory 14, the address of a reference pattern in a pattern reference ROM 16 is passed to the pattern storage memory 14 and the reference pattern is also retrieved by the pattern storage memory 14. The overlay and reference patterns are compared in a comparison circuit 18, typically using a bit by bit comparison. The result is passed to a control circuit 20.

The control circuit 20 is coupled to a digital to analog converter (D/A converter) 26. The D/A converter 26 receives the digital video pixel data 30 from the console's memory and CPU and outputs an analog video output 34 to a display device, hereinafter screen. If there is an exact match between the overlay pattern and the reference pattern the overlay control and color expansion circuit 22 de-references the overlay pattern in a look-up table and determines where on the screen the pattern should be displayed. The overlay pattern is then combined with video pixel data 30 in a pixel multiplexer 24 to make sure that the overlay pattern will be visible on the screen.

The control circuit 20 also receives a digital to analog blanking signal 32 (D/A blanking signal) from a conventional synchronizing ("sync") signal generator (not shown) in the CRT controller. If there is any difference between the overlay pattern and the reference pattern then the control circuit 20 permanently applies the D/A blanking signal 32 to the D/A converter. When the D/A blanking signal 32 is applied to the D/A converter 26, the analog video output 34 is the blanking signal 32 instead of the video pixel data with the overlay pattern.

One problem with such a security device 10 is that it requires a great deal of memory. For a 32×16×2 overlay pattern the security device 10 requires 1024 bits of RAM for the overlay pattern, in addition to the 1024 bits of ROM needed to store the reference pattern in the pattern reference ROM 16.

Additionally, the security device 10 requires a great deal of logic circuitry. The comparison circuit itself requires a large amount of logic circuitry to perform a bit by bit comparison of the entire overlay and reference patterns. Furthermore, the security device 10 also requires the overlay control and color expansion circuit 22 to de-reference the pattern through a look-up table. The security device 10 also needs the pixel multiplexer 24 to multiplex the pixels in the overlay pattern with the video pixel data 30.

Both the large memory requirement and the large logic requirement increase the complexity and area of the chip, making the chip both larger and more expensive. This goes against the long time goals of the semiconductor industry to reduce the size of an integrated circuit (IC) for a given functionality and to reduce the cost of ICs.

Another problem with the security device 10 is that the location of the read/write memory serving as the pattern storage memory 14 must be disclosed to the software to allow the software to place the overlay pattern into the pattern storage memory 14. This requires future hardware to maintain register compatibility, placing restrains on the future hardware. If register compatibility is not maintained the software will not be transportable between versions of the console. This would require the user to either not upgrade the console or to repurchase all of the games for the upgraded console, both unacceptable alternatives.

A further problem with the security device 10 is that the overlay pattern is checked and then displayed on the screen, leaving open the possibility that the correct overlay pattern may be replaced with another overlay pattern after the overlay pattern is compared to the reference pattern, but before the overlay pattern is displayed. It also allows for the possibility that the overlay control and color expansion circuit 22 and pixel multiplexer 24 will be completely by-passed and the overlay pattern may be simply not displayed at all. Both of these possibilities would make the security device 10 useless in stopping unlicensed games from being played on the console.

SUMMARY OF THE INVENTION

The present application discloses a method and circuits for comparing a pattern to a protected pattern by generating a check value from the pattern that contains fewer bits than the pattern and comparing it to a reference value, that also has fewer bits than the pattern. The reference value is the value generated by the protected pattern using the same algorithm used by the check. The check value is compared to the reference value to verify that the check value matches the reference value. For added security a second check value can be generated from the same pattern and compared to a second reference value to verify that the pattern is the protected pattern.

In one embodiment of the invention a CRC circuit performs a first CRC on a portion of a data signal to obtain a first CRC value which is compared in a comparison circuit to a first CRC reference value, stored in a first memory circuit. The output of the comparison circuit is coupled to a first input of a control circuit, which has a second input coupled to a blanking signal. The control circuit produces and latches the blanking signal at its output responsive to the first CRC value not being equal to the first CRC reference value.

A particularly useful application of the present invention is in regularly checking a pattern displayed on a portion of video display. After the CRC value generated by the pattern is compared to the CRC reference value, the result is passed to a control circuit which sends a blanking signal to the digital to analog converter. The signal generated by the converter to produce the video display is stopped and a blank signal is sent to display.

The novel features believed characteristic of the invention are set forth in the appended claims. The nature of the invention, however, as well as its features and advantages, may be understood more fully upon consideration of illustrative embodiments when read in conjunction with the accompanying drawings, wherein:

BRIEF DESCRIPTION OF THE DRAWINGS

FIG. 3 is a circuit diagram, in block form, of the security device according to an embodiment of the present invention.

FIG. 4 is a circuit diagram, in block form, of a position loading circuit according to the present invention.

DETAILED DESCRIPTION OF THE PREFERRED EMBODIMENT

Figure 1:
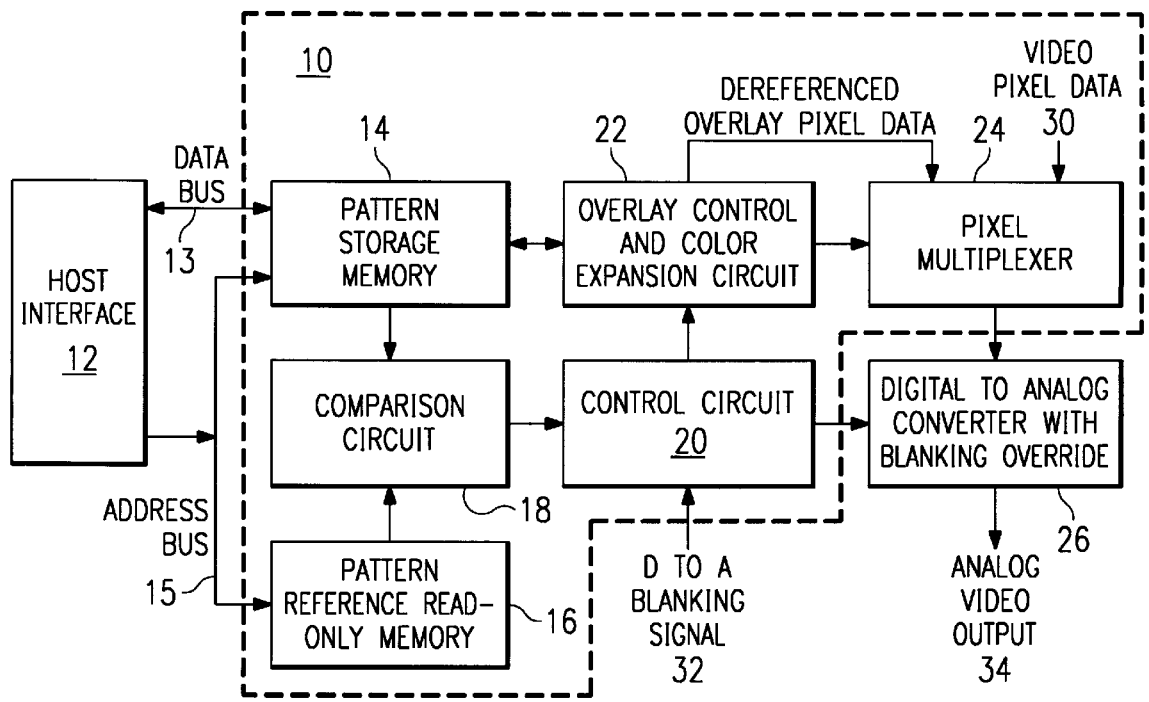
FIG. 1 is a circuit diagram, in block form, of a conventional security device.
Figure 2:
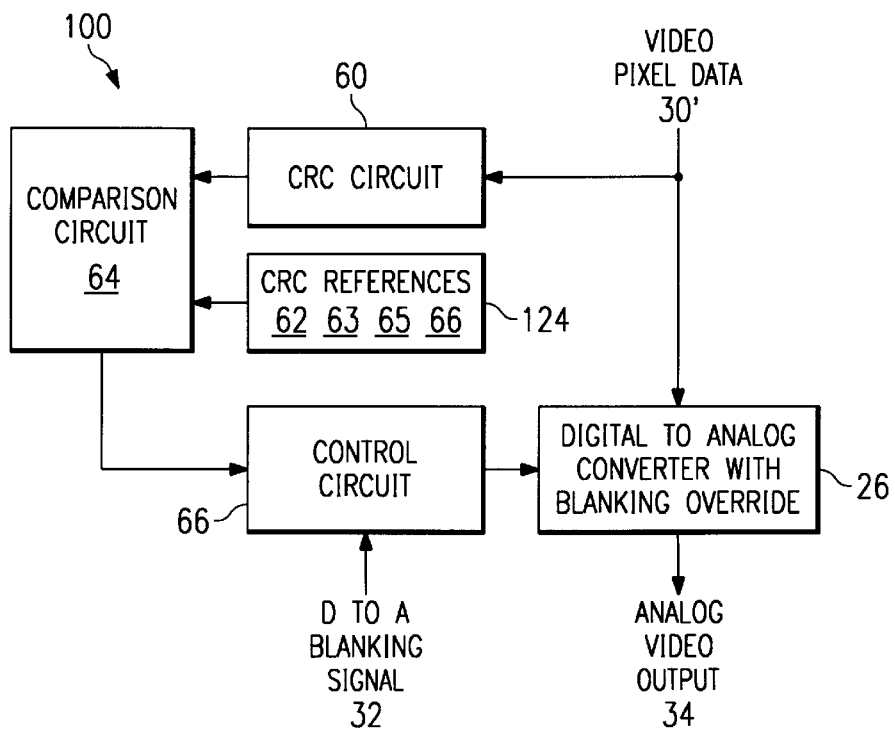
FIG. 2 is a circuit diagram, in block form, of a security device according to an embodiment of the present invention.

Referring to FIG. 2, a security device according to an embodiment of the invention is designated by the reference numeral 100. The security device 100 contains a cyclic redundancy check ("CRC") circuit 60 connected to a comparison circuit 64. The CRC circuit 60 receives data at its input, in the present embodiment the data is video pixel data 30'. A first memory 62 for storing a first CRC reference value is also connected to the comparison circuit 64.

The video pixel data 30' is processed in the CRC circuit 60 to generate a first CRC value at the output of the CRC circuit 60. A 32×16×2 pattern can generate a 15 bit CRC value, allowing the security device 100 to use one 24 bit register as the first memory 62. The first memory 62 is therefore much smaller than the 1024 bit pattern storage memory 14 in the conventional security device 10 required for the 32×16×2 pattern.

The comparison circuit 64 compares the first CRC value and the first CRC reference value. If the first CRC value and the first CRC reference value are not the same the comparison circuit 66 produces an unequal signal at its output. The output of the comparison circuit 64 is a first input of a control circuit 66. A D/A blanking signal 32 is a second input of the control circuit 66. Responsive to the unequal signal the control circuit 66 produces and latches the D/A blanking signal 32 at its output. The output of control circuit 66 is connected to a D/A converter with blanking override 26. When the D/A blanking signal 32 is not latched at the output of the control circuit 66 and therefore the input of the D/A converter 26, the D/A converter 26 produces an analog video output 34 at its output based on the video pixel data 30' received at its input. When the first CRC value and the first CRC reference value do not match, the D/A blanking signal 32 is latched and the D/A converter does not produce analog video output 34, the screen goes blank and the console which the security device 100 is a part of shuts down.

For interlaced images the CRC circuit generates a first even and a first odd CRC value. Because in an interlaced image only half the pixels are present in successive frames the first even CRC value will differ from the first odd CRC value. The CRC reference value will also need to be a based on an even or odd interlaced frame, or two CRC reference values, a CRC even reference value and a CRC odd reference value. The even or odd CRC value is compared to its respective CRC reference value in the comparison circuit 64 and the result passed to the control circuit 66.

For additional security the CRC reference circuit can generate a second CRC value, as explained below. The comparison circuit 64 compares the second CRC value to a second CRC reference value stored in a second memory 65. When the two do not match the D/A blanking signal 32 is produced at the output of the comparison circuit 64 and is latched by the control circuit 66 at the input of the D/A converter 26. The D/A converter 26 does not produce analog video output 34, the screen goes blank and the console which the security device 100 is a part of shuts down. Having two CRC values increases the security of the security device 100, because to keep the console from shutting down without using the protected pattern the unlicensed game manufactures now has to generate a pattern different from the protected pattern that generates two different CRC values identical to the reference CRC values.

FIG. 3 shows an embodiment of the security device 100 in more detail. The CRC circuit 60 contains a timer circuit 70 that contains a duration counter 104 for determining when to start checking the frames to make sure they contain the protected pattern and an enable counter 106 for determining how many frames to check at a time. The protected pattern should appear on the screen long enough to be visible to a human viewer, preferably for about 30 seconds, and fairly often, preferably about every 10 minutes. A 6 bit enable counter 106 counts until 64 frames are checked. A 15 bit duration counter will start checking the frames about every 11 minutes. Both the enable 106 and the duration 104 counters are typically up counters made of a chain of flip-flops, although any conventional counters that starts checking for the protected pattern fairly often and check for about 30 seconds at a time can be used.

When the system is first turned on the counters 104 and 106 are reset. The enable 106 and duration 104 counters are synchronized to start when the first frame containing the protected pattern is sent to the screen, this can be done through the CPU of the console containing the security device 100. The enable counter 106 counts 64 frames and resets the duration counter 104. The duration counter 104 then counts until it reaches predetermined interval value and the then resets the enable counter 106 again. Until the duration counter 104 reaches the interval value the enable counter 106 remains dormant. The time the duration counter 104 needs to count to the interval value should at least as long than the time the software waits before re-displaying the protected pattern.

When the duration counter 104 resets the enable counter 106, the enable counter enables the CRC circuit 60. When the enable counter 106 is dormant the remainder of the CRC circuit 60 is also dormant. During this time the inputs of the comparison circuit 64 do not change and the output of the comparison circuit 64 remains the same. If the last CRC value matched the reference CRC the output of the comparison circuit will not toggle flip-flop 108 of the control circuit 66. This allows the last signal on the output of the flip-flop 108 to remain on the output of the flip-flop 108. The output of the flip-flop 108 is the input of the D/A converter 26, thus keeping the output of the D/A converter 26 as the analog video output 34.

When the enable counter 106 is counting, the remainder of the CRC circuit 60 calculates the CRC values. The CRC circuit 60 contains a position circuit 80 having an X/Y start position circuit 130 and an X/Y window generator 128. The X/Y start position circuit 130 contains two 8 bit registers that store the starting position of the protected pattern on the screen, and a position loading circuit 82 shown in FIG. 4. The checking of the protected pattern cannot start until the exact position where the protected pattern starts on the screen is found. The simplest way to detect when a X or Y value has been reached is for the position loading circuit 82 to use the 2's complement to invert the X or Y value and start checking when the counters reach zero. The X or Y value is the input of the position loading circuit 82. The value is inverted in inverter 84 and then ORed with the previous result of the position loading circuit 82 in OR gate 84. The result is incremented by one and produced at the output of flip-flop 90 and therefore the position loading circuit 82 the next time the flip-flop is clocked. The programming resolution of the start position is 1 pixel in the x-direction, but is 2 pixels in the y-direction to ensure that the region always starts on an even field.

Referring again to FIG. 3, the start position is passed to an X/Y window generator 128 that determines the size of the window that will be checked for the protected pattern. The X/Y window generator 128 has an 10 bit X counter and a 9 bit Y counter. Although for a protected pattern having a size of 32×16×2 a 5 bit X counter and a 4 bit Y counter can be used. The X counter counts until the 32 pixels in the X direction are processed and the Y counter has to count until the 8 lines in the Y direction are processed when the image on the screen is interlaced. The X counter is loaded by a not_blank pulse generated during each frame by the sync generator and clocked by the console's clock PClk. The Y counter is loaded by a vblank pulse generated between each frame by the sync generator and clocked by the not_blank pulse. Both counters are typically down counters made of a chain of flip-flops, although any conventional counters can be used.

The X and Y counters of the X/Y window generator 128 are connected to a checksum circuit 126. The checksum circuit 126 also receives a seed value from a seed value generator 120. A seed value is the value loaded into the checksum circuit 126 prior to the first pixel value and is used in generating the CRC value. Different CRC values can be generated for the same pattern using different seed values. The seed values are chosen based on the security requirements typically a randomly chosen 6 digit hexadecimal seed value will be secure. The seed values should not be readable outside the security device 100. In the preferred embodiment the seed value generator 120 is capable of generating 2 seed values. The seed value generator 120 has an AND gate connected to a flip-flop and registers (not shown) for storing the seed value. The AND gate receives an odd_not_event pulse and vblank pulse that signal an even frame when the output of the AND gate is one. This makes the flip-flop toggle every even frame. The output of the seed value generator 120 is connected to the checksum circuit 126 supplying the checksum circuit 126 with a different seed value every even frame. The output of the seed value generator 120 is also connected to the memory containing the CRC reference values 124, signalling whether the first CRC reference values or the second CRC reference values should be supplied to the comparison circuit 64. Two seed values are used to increase the security of the security device 100. As explained above, it is much more difficult to generate a pattern different from the protected pattern that generates two identical CRC values than a different pattern that generates one identical CRC value. Therefore to keep the security device 100 from shutting down the console, the software must generate and display the protected pattern, allowing the pattern owner to stop the software if the software producer is not licensed to use the protected pattern.

When the enable output of the X/Y start position generator 132 signals that the exact position where the protected pattern starts on the screen is found, the X and Y counters of the X/Y window generator 128 are reset to count down from the number bits corresponding to the number of pixels and lines, respectively, in the protected pattern. While the X and Y counters are counting down, the checksum circuit 126 receives the video pixel data 30' through a pixel multiplexer (Pel Mux) 122. The checksum is based around a 24-bit shift register, with the output of the 24th bit inverted and fed back into the input of the 1st bit. Certain stages also have taps, which consist of another input exclusive-ORed with the input to that stage. The output of the 24th bit feeds back to three taps. Alternatively, any conventional checksum circuit that can generate a CRC value can be used.

The 15 bits of pixel data which are to be checksummed are connected to the taps on bits 14 to 0, producing the CRC values. When the checksum circuit 126 uses the first seed value the checksum circuit produces the first CRC value, and when the checksum circuit 126 uses the second seed value the checksum circuit 126 produces the second CRC value. As described above, when the image is interlaced, the checksum circuit produces an odd and an even CRC values. Therefore, in an interlaced image when there are two seed values, the checksum circuit will produce four CRC values. It is desirable to check all four to make sure the pattern on the screen is the protected pattern, requiring four CRC reference values, each of which is stored in a 24 bit register, bringing the total memory requirements of the security device 100 to 96 bits. The memory requirements of the security device 100 is still much smaller than the memory requirements of the conventional security device 10 of 2048 bits. However, depending on the security requirement of the system and the memory available less than all four CRC values need to be compared. For example only one seed value can be used and both the even and odd, or just the even or odd CRC values can be used for the comparison with the reference CRC values; or only the even or odd CRC values of both the first and second CRC values can be used for the comparison with the reference CRC values.

The output of checksum circuit 126, i.e. the CRC value, is the first input of the comparison circuit 64, and the output of one of the memory registers 124 is the second input of the comparison circuit 64. The register used is based on the output of the seed value generator 120 and whether the frame is an even or odd frame. In the comparison circuit 64 of the preferred embodiment, each bit of the CRC value is exclusive ORed with a corresponding bit of the CRC reference value, and then the results are ORed together, although any comparison circuit that can compare two relatively small values can be used. Because the data that is to be compared in the comparison circuit 64 is only 24 bits long, the comparison circuit 64 can be much simpler than the comparison circuit required in the conventional security device 10 that had to compare the entire data pattern to the security data pattern.

The output of the OR gates in the comparison circuit 64 is the output of the comparison circuit 64 and the input of the control circuit 66. If the result is a 1 the CRC value does not match the CRC reference value producing the unequal signal that causes the control circuit 66 to produce and latch a security breach signal. The security device 100 can be configured to take the appropriate action in response to the security breach signal. For example, in response to the security breach signal the security device 100 can blank the screen, as described below, or generate and latch an image on the screen saying unlicensed software, or produce and latch a verbal warning or siren. The security breach signal is latched until a security reset signal, which can be a power-on-reset pulse or a system hardware reset, is produced.

In the embodiment shown in FIG. 3, the 1 on the output of the comparison circuit 64 toggles the flip-flop 108 of the control circuit 66 and allows the D/A blanking signal 32 on the input of the flip-flop 100 to pass to the output of the flip-flop 108 latching the D/A blanking signal on the output of the flip-flop 108, producing the security breach. The output of the flip-flop 108 is the input of the D/A converter, therefore the D/A blanking signal 32 is now latched on the D/A converter, the image on the screen goes blank and the console shuts down. The D/A blanking signal 32 is latched until the security reset signal is produced. In an embodiment of the invention, some logic circuitry can be added to stop the clocking of the enable counter 106 once the security breach is produced and latched, which would stop the security device 100 from calculating the CRC values. The enable counter 106 would only be reset in response to the security reset signal.

Additional seed values and corresponding CRC reference values can be used for additional security. However, each additional CRC reference requires another 24 bits of memory, or 48 bits of memory in interlaced images, and additional logic to supply the seed values to the checksum circuit 126 and the logic to select the proper CRC reference value. Therefore, the security provided with addition of each algorithm and corresponding CRC reference value must be balanced with the cost involved in adding the additional memory and logic.

Test circuitry can be added to the security device 100 to allow for the security device 100 to be tested. For example, a control register containing bits to signal that the security device 100 is in a test mode, that there is a security breach, that the X and Y count of the window generator is in the range where the protected pattern is located. A checksum test register can be added that can store the which seed value is used, whether the seed value generator should toggle, whether the security should be enabled and the mode of the checksum. Also, logic gates having an input for receiving a signal indication the that the security device is in test mode can be added by one skilled in the art for the test mode of the security device to not affect the remained of the console.

Therefore the invention allows for checking a data stream being sent to the screen to make sure it contains a protected pattern. This provides the advantage that the pattern will not be replaced or changed after it is checked but before it is displayed because the checking is performed on the video being sent to the screen. The checking is performed by generating a CRC value of the pattern and comparing the CRC value to a reference CRC value, and then producing and latching a blanking signal on the D/A converter processing the data stream when the CRC value does not match the reference CRC value. Using the CRC value of the pattern instead of the entire pattern provides the additional advantages of reducing the complexity of the comparison circuitry and the size of the memory needed from 1024 bits to 24 bits or 48 bits.

This is all accomplished without noticeably reducing the security because it is difficult to generate the same CRC value with a different pattern. This becomes even more difficult when the CRC value is generated using a seed value and the is not readable from the security device. For additional security the CRC circuit can generate a second CRC value based on a second seed value and the video pixel data. Having two CRC values increases the security of the security device because to keep the console from shutting down without using the protected pattern the unlicensed game manufactures now has to generate a pattern different form the protected pattern that generates two different CRC values identical to the reference CRC values.

Figure 5:
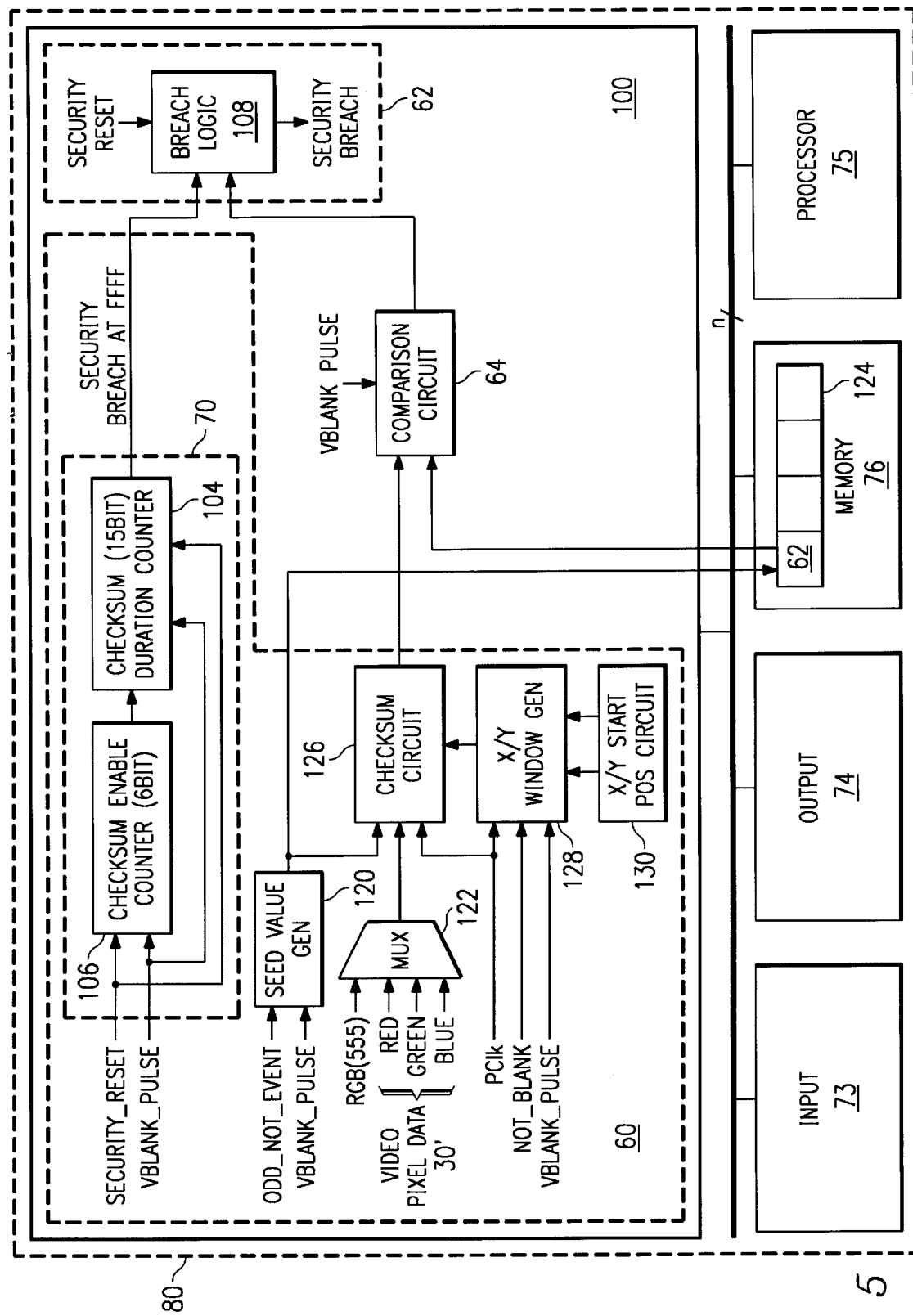
FIG. 5 is a circuit diagram, in block form, of a game console containing the security device according to the present invention.

The security device 100 can be used in a computer or a game console 80, as shown in FIG. 5. The game console 80 contains an input device 73, a memory 76, a processor 75, and is coupled to an output device 74.

While the security device is described as using a CRC, other check methodologies can be used provided the check methodology produces a value having fewer bits than a number of bits in the pattern and that can only be generated by a small number of patterns, or preferably by a unique pattern.

Additionally, while the invention has been described as checking video data the invention can be used with other data, such as audio data.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

I claim:

1. A method of verifying the use of a pattern in data, comprising the steps of:

performing a check on a selected portion of the data to obtain a first value having fewer bits than a number of bits in the selected portion;

comparing the first value with a first reference value, the reference value having fewer bits than the number of bits in the selected portion; and verifying use of the pattern if the first value favorably compares with the first reference value.

2. The method of claim 1, further comprising the steps of:

performing a second check on the selected portion of the data to obtain a second value having fewer bits than the number of bits in the selected portion;

comparing the second value with a second reference value, the second reference value having fewer bits than the number of bits in the selected portion; and verifying use of the pattern if the second value favorably compares with the second reference value.

3. The method of claim 1, wherein the first value is a CRC value and the first reference value is a first CRC reference value.

4. A method of verifying the use of a protected pattern in data, comprising the steps of:
performing a cyclic redundancy check (CRC) on a selected portion of the data to obtain a first CRC value;
comparing the first CRC value with a first CRC reference value to produce an unequal signal responsive to the first CRC value being unequal to the first CRC reference value; and
producing a security breach signal responsive to the unequal signal.

5. The method of claim 4, wherein the security breach signal is a blanking signal.

6. The method of claim 4, wherein the step of performing the CRC on a selected portion of the data comprises:
generating a first seed value;
using the first seed value and a digital representation of the selected portion of the data to generate the first CRC value.

7. The method of claim 4, further comprising the steps of:
performing a second CRC on the selected portion of the data to obtain a second CRC value;
comparing the second CRC value with a second CRC reference value to produce an unequal signal; and
producing the security breach signal responsive to the unequal signal.

8. The method of claim 7, wherein the step of performing the CRC on a selected portion of the data comprises:
generating a second seed value;
using the second seed value and a digital representation of the selected portion of the data to generate the second CRC value.

9. The method of claim 4, further comprising the step of:
resetting the latching of the security breach signal only responsive to a power on reset.

10. The method of claim 4, further comprising the step of:
resetting the latching of the blanking signal only responsive to a system hardware reset.

11. A security device comprising:
a check circuit, for performing a first check on a portion of a data signal to obtain a first check value;
a first memory circuit, for storing a first check reference value;
a comparison circuit for comparing the first check value and the first check reference value, the comparison circuit having a first input coupled to an output of the check circuit, a second input coupled to an output of the first memory circuit, and an output for generating an unequal signal on the output of the comparison circuit responsive to the first check value not being equal to the first check reference value;
a control circuit having a first input coupled to the output of the comparison circuit, and an output, for the control circuit producing a security breach signal at the output of the control circuit responsive to the unequal signal.

12. The security device of claim 11, wherein:
the control circuit further includes a second input coupled to a blanking signal; and,
the security breach signal is the blanking signal.

13. The security device of claim 11, wherein the output of the control circuit is coupled to an input of an analog to digital converter for latching the security breach signal on the digital to analog converter.

14. The security device of claim 11, wherein the first memory consists of 24 bits.

15. The security device of claim 11, wherein the first memory consists of a register.

16. The security device of claim 11, further comprising:
a first counter for determining when to start checking the frames to make sure they contain the protected pattern, having an output coupled to the control circuit;
a second counter for determining how many frames to check, having an output coupled to reset of the first counter.

17. The security device of claim 1 1, wherein the control circuit comprises:
a flip-flop clocked by the output of the comparison circuit, an input coupled a blanking signal, a reset, and an output, the flip-flop for producing and latching the blanking signal at the output responsive to the unequal signal.

18. The security device of claim 11, wherein:
the check circuit is a CRC check circuit;
the check value is a CRC check value; and,
the check reference value is a CRC reference value.

19. The security device of claim 18, further comprising a seed value generator for generating two or more seed values to provide to the CRC circuit; wherein the CRC circuit performs the first CRC on a portion of a data signal using a first seed value to obtain the first CRC value.

20. The security device of claim 19, further comprising:
a second memory coupled to the comparison circuit, for storing a second CRC reference value;
wherein the CRC circuit performs the CRC on a portion of a data signal using a second seed value to obtain a second CRC value; and
wherein the second CRC value and the second CRC reference value are compared in the comparison circuit and generate an unequal signal on the output of the comparison circuit responsive to the second CRC value not being equal to the second CRC reference value.

21. A game console comprising:
in input device;
an output device for displaying a series of images;
an integrated circuit coupled to said input device and said output device having:
a check circuit, for performing a first check on a portion of a data signal to obtain a first check value having fewer bits than a number of bits in the portion of the data signal;
a first memory circuit, for storing a first check reference value;
a comparison circuit for comparing the first check value and the first check reference value, the comparison circuit having a first input coupled to an output of the check circuit, a second input coupled to an output of the first memory circuit, and an output for generating an unequal signal on the output of the comparison circuit responsive to the first check value not being equal to the first check reference value;
a control circuit having a first input coupled to the output of the comparison circuit, and an output, for the control circuit producing a security breach signal at the output of the control circuit responsive to the unequal signal.

22. The game console of claim 21, wherein:

the control circuit further includes a second input coupled to a blanking signal; and, the security breach signal is the blanking signal.

23. The game console of claim 21, further comprising an analog to digital converter having an input coupled to an output of said control circuit, for latching the security breach signal on the digital to analog converter.

24. The game console of claim 21, wherein the first memory consists of a register.

25. The game console of claim 21, wherein the first memory consists of 24 bits.

26. The game console of claim 21, wherein the control circuit comprises:

a flip-flop clocked by the output of the comparison circuit, an input for receiving a blanking signal, a reset coupled to the power-on-reset, and an output, the flip-flop for producing and latching the blanking signal at the output responsive to the unequal signal.

27. The game console of claim 21, further comprising:

a first counter for determining when to start checking the frames to make sure they contain the protected pattern, having an output coupled to the control circuit;

a second counter for determining how many frames to check, having an output coupled to reset of the first counter.

28. The game console of claim 21, wherein:

the check circuit is a CRC check circuit;

the check value is a CRC check value; and, the check reference value is a CRC reference value.

29. The game console of claim 28, further comprising a seed value generator for generating two or more seed values to provide to the CRC circuit; wherein the CRC circuit performs the first CRC on a portion of a data signal using a first seed value to obtain the first CRC value.

30. The game console of claim 29, further comprising:

a second memory coupled to the comparison circuit, for storing a second CRC reference value;

wherein the CRC circuit performs the CRC on a portion of a data signal using a second seed value to obtain a second CRC value; and wherein the second CRC value and the second CRC reference value are compared in the comparison circuit and generate an unequal signal on the output of the comparison circuit responsive to the second CRC value not being equal to the second CRC reference value.

* * * * *

UNITED STATES PATENT AND TRADEMARK OFFICE
CERTIFICATE OF CORRRECTION

PATENT NO. : 6,006,354
DATED : December 21, 1999
INVENTOR(S) : Peter John McGuinness It is certified that error appears in the above-identified patent and that said Letters Patent is hereby corrected as shown below:

On the title page, item [56], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 4 | 5 | 4 | 5 | 9 | 4 | 6/12/84 | Heffron et al. | 713 | 200 | |
| | | 5 | 4 | 5 | 4 | 0 | 0 | 0 | 9/26/95 | Dorfman | 714 | 54 | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | 0 | 6 | 9 | 8 | 8 | 4 | 2 | A 1 | 2/28/96 | Europe | | | |
| | 0 | 7 | 5 | 4 | 9 | 9 | 9 | A 1 | 1/22/97 | Europe | | | |

Signed and Sealed this

Twenty-sixth Day of September, 2000

Attest:

Q. TODD DICKINSON

*Attesting Officer*  *Director of Patents and Trademarks*